Aug. 22, 1950     C. LE R. DARR     2,520,031
MACHINE FOR MEASURING DISTANCES AND
LOCATING A BALL ON A PLAYING FIELD
Filed May 3, 1947     2 Sheets-Sheet 2
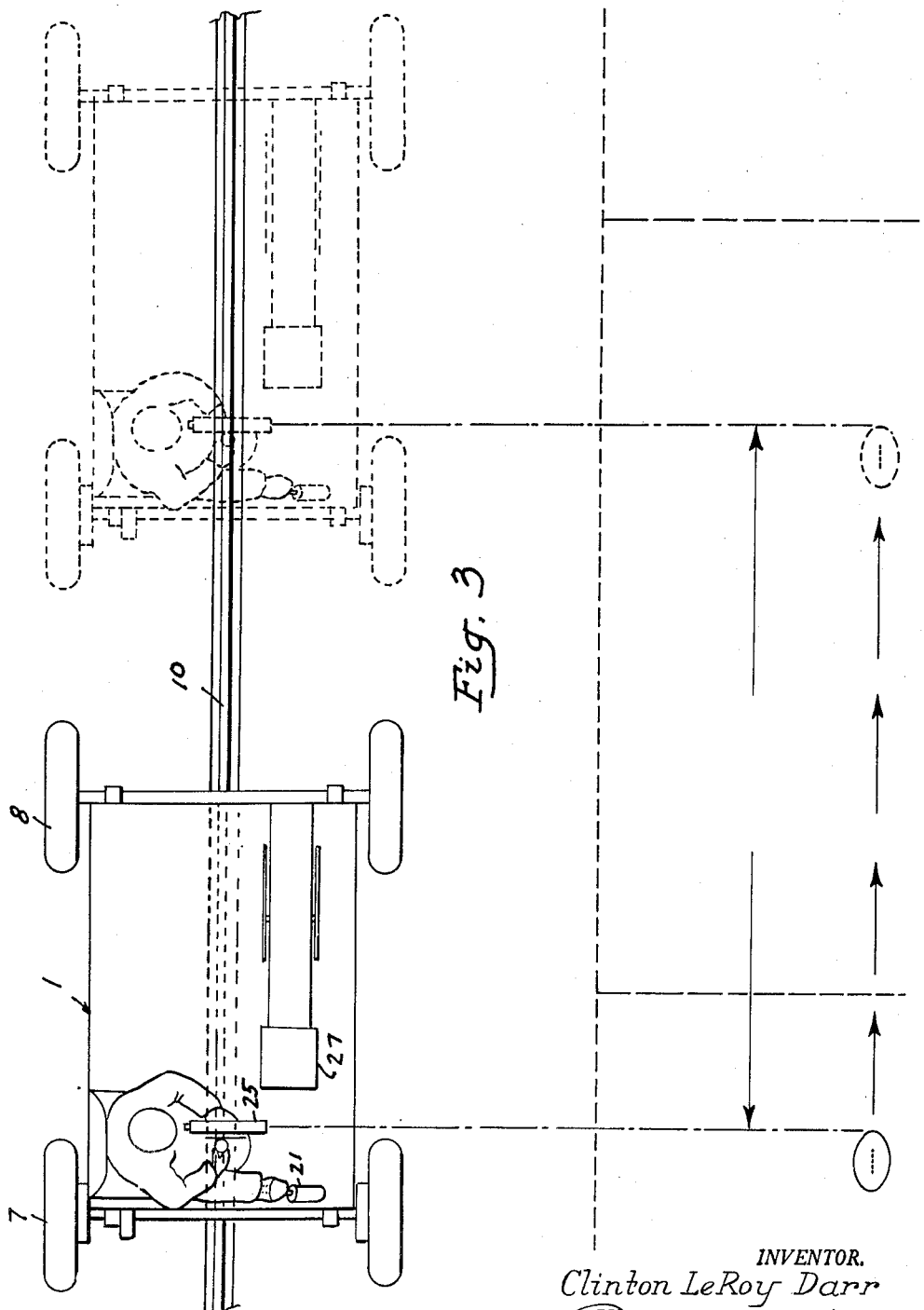
INVENTOR.
Clinton LeRoy Darr
BY James O. Givnan,
Atty.

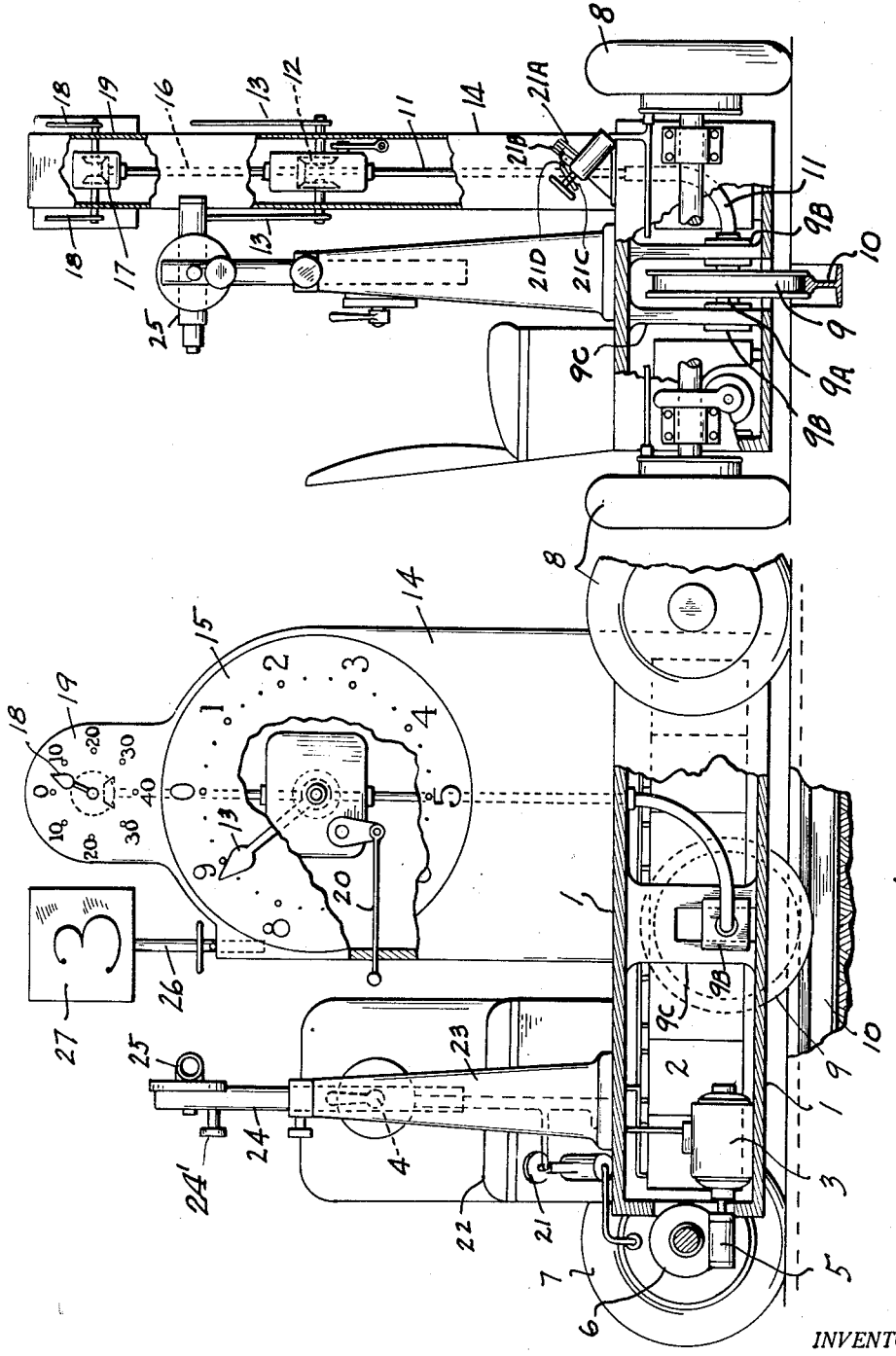

Patented Aug. 22, 1950

2,520,031

UNITED STATES PATENT OFFICE 2,520,031

MACHINE FOR MEASURING DISTANCES AND LOCATING A BALL ON A PLAYING FIELD

Clinton Le Roy Darr, Vancouver, Wash.

Application May 3, 1947, Serial No. 745,883

2 Claims. (Cl. 33—46)

This invention relates to improvements in machines for measuring distances and locating a ball on a playing field and for indicating the yardage between a given point and the location of a ball on a playing field, such for instance, as in a game of football where it becomes necessary to determine accurately the number of yards gained in a play or lost through failure of a play, or by penalties, or the like.

One of the principal objects of the invention is to provide a machine of this character which operates on a single track arranged parallel to the side line of a playing field and which will accurately indicate its distance of travel between any two points. The machine also includes means for indicating the number of "downs" accomplished and yards to go.

A further object is the provision of sighting means for spotting the ball on the field and means for moving the machine in accurate alignment with it. The amount of travel of the machine in either direction in its locating work is conspicuously indicated on two large dials by indicating pointers associated therewith.

These and other objects will appear as my invention is more fully hereinafter described in the following specification, illustrated in the accompanying drawings and finally pointed out in the appended claims.

In the drawings:

Figure 1 is a side elevation of a machine made in accordance with my invention and with fragments broken away for convenience of illustration.

Figure 2 is an end elevation of Figure 1 with parts similarly broken away.

Figure 3 is a diagrammatic lay-out of a fragment of a playing field and a plan view of the machine in full and dotted lines to indicate its movement relative to the length of the field.

Referrring now more particularly to the drawings:

In Figures 1 and 2, reference numeral 1 indicates the chassis of the machine which is of box like formation and within which is housed a plurality of electric storage batteries 2 connected with an electric motor 3 through any approved type of switch 4 for actuating the same. The motor is of the reversible type and may drive the vehicle to the left or right as viewed in Figure 1 through the medium of the worm 5 and worm gear 6 connected with the axle or traction wheels 7. The other wheels 8 are idling wheels on fixed axles and the wheels are not steerable so that the vehicle will at all times run in a straight line parallel to the field. To stabilize the vehicle in its direction of travel I provide a flanged wheel 9 engaged with the track 10 embedded in the ground below the surface of the field. The axle 9A of the wheel is carried by bearing blocks 9B which are slidably mounted in webs 9C formed in the chassis. This floating feature is provided to cause the wheel to remain in rolling contact with the track during movement of the vehicle over any irregularities in the surface of the ground. The wheel 9 being frictionally driven by the track operates by means of a flexible shaft 11 and gears 12, a pair of pointers 13 disposed on opposite sides of a standard 14 in cooperation with dials 15 carried by the standard. Another shaft 16 extends upwardly from the gear assembly 12 to drive through gears 17 another pair of pointers 18 in cooperation with dials 19 to indicate yardage. As the machine moves to the right or left I may selectively impart rotation to all the pointers in the proper direction by means of a reversing mechanism generally indicated at 20. I may also re-set the pointers to "0" if desired by any well known means. The driving wheels 7 are provided with any approved type of foot brake 21 within convenient reach from the operator's seat 22 so that the vehicle may be stopped abruptly at any desired location.

In order to break the electrical circuit to the motor 3 at the instant the brake 21 is applied and independent of the switch 4, I provide a switch actuated by the brake pedal. The switch consists of a stationary contact 21A cooperating with a movable contact 21B carried by a spring urged bell-crank 21C pivotally mounted as at 21D, and whose one leg is in the path of movement of the brake pedal so that as the pedal is depressed to apply the brakes the contacts will be separated and the motor circuit broken. Adjustably mounted to the column 23 that supports the switch 4 is a post 24 upon which is adjustably mounted in a vertical plane a scope sight of the cross-hair type as indicated at 25, which may be adjusted to any level desired by the operator, the post 24 being locked in any vertical adjusted position by means of the thumb screw 24'. Rotatably mounted upon the standard 14 is a post 26 whose upper end carries a signal 27 of square formation and on each of whose sides is a numeral indicating the number of "downs."

As shown in Figure 3 the operator of the vehicle as shown in full lines spots the ball at the beginning of the play and as the ball moves the vehicle moves along the track into a position as shown in dotted lines where the operator can accurately spot the ball. During this space of travel the number of yards are accurately indicated on the dials as aforesaid.

Typical operation of the machine during a portion of a game of football, is as follows:

As the ball is kicked off, the operator stations the machine near the opposite 20 yard line, and operates the machine either right or left, following the return of the ball, until it is downed, at which point the operator lines in the nose of the ball with the scope, moving the machine either left or right, as may be necessary, and sets the pointers at zero or ten, depending on the direction of travel of the ball. At the end of each play, he lines in the forward nose of the ball, with the scope, by running the machine into position, and sighting through the scope until the vertical wire is in line with the forward nose of the ball, and the gauges accurately show the distance remaining to a first down. Should there be a penalty distance assessed, whether from the point of the foul or from the position of the ball when the last previous play started, the operator is notified of the penalty distance and direction by the head linesman; and, after lining in the point where the penalty distance begins, runs the machine the required distance as indicated by the gauges. At all times, the operator holds his position at the point where the ball was last put in play until the new play is completed and he is signalled to move, thus taking care of a situation where a play is called back.

While I have shown a particular form of embodiment of my invention, I am aware that many minor changes therein will readily suggest themselves to others skilled in the art without departing from the spirit and scope of the invention.

Having thus described the invention, what I claim as new and desire to protect by Letters Patent is:

1. A machine of the class described comprising a chassis supported by a plurality of ground engaging wheels, a reversible electric motor supported by the chassis and operatively connected with certain of said wheels, a switch for controlling the operation of said motor, a wheel rotatably supported on an axle having a vertical floating support in said chassis, said wheel having rolling contact with a track disposed parallel to a playing field, a braking mechanism associated with certain of said ground engaging wheels and operable by a brake pedal, a second switch operable by said brake pedal for breaking the circuit to the motor upon applying the brakes by downward movement of the brake pedal, a plurality of indicator dials supported by said chassis, a plurality of pointers associated with the dials, a flexible power transmission means between said floating wheel and said pointers for rotating the pointers in clockwise or anti-clockwise directions with respect to the dials upon movement of the chassis in forward or reverse directions, and a scope sight vertically adjustably supported on the chassis and having its axis at right angles to the line of travel of the chassis, whereby an object on a playing field may be aligned with the scope at the beginning of a play and followed by the machine to the end of the play whereupon the object is again sighted and the distance traveled by the machine and the object is accurately indicated on said dials.

2. A machine of the class described comprising a chassis supported by a plurality of ground engaging wheels, an electric motor supported by the chassis and operatively connected to certain of said wheels for driving same, a wheel rotatably supported by the chassis and having vertical floating movement relative thereto, a track disposed parallel to a playing field with which said floating wheel has rolling contact, a plurality of indicating dials supported by the chassis, a plurality of pointers associated with the dials, a flexible drive connection between said floating wheel and said pointers, an operator's seat mounted on the chassis, a switch supported by the chassis adjacent said seat for controlling said motor, a braking mechanism for certain of said ground engaging wheels, a brake pedal for actuating said braking mechanism, a normally closed switch operable by said pedal for breaking the electric circuit to said motor, and a scope sight supported by said chassis above said seat.

CLINTON LEROY DARR.

REFERENCES CITED

The following references are of record in the file of this patent:

UNITED STATES PATENTS

| Number | Name | Date |
|---|---|---|
| 620,628 | Woods | Mar. 7, 1899 |
| 738,167 | Day | Sept. 8, 1903 |
| 918,402 | Vorreiter | Apr. 13, 1909 |
| 1,717,805 | More | June 18, 1929 |
| 2,285,723 | Kerrigan | June 9, 1942 |